United States Patent [19]

Burton

[11] Patent Number: 4,737,891
[45] Date of Patent: Apr. 12, 1988

[54] SUPPORT AND ADJUSTMENT MECHANISM FOR VEHICLE HEADLAMP

[75] Inventor: John E. Burton, Evanston, Ill.

[73] Assignee: Accurate Threaded Fasteners, Inc., Lincolnwood, Ill.

[21] Appl. No.: 931,541

[22] Filed: Nov. 17, 1986

[51] Int. Cl.⁴ .................................................. B60Q 1/00
[52] U.S. Cl. ...................................... 362/61; 362/273; 362/250; 362/269; 362/66
[58] Field of Search ................. 362/66, 61, 68, 69, 362/70, 273, 250, 269

[56] References Cited

U.S. PATENT DOCUMENTS

| | | |
|---|---|---|
| Re. 32,088 | 2/1986 | Sip . |
| 1,967,515 | 7/1934 | Ricker ................................. 362/71 |
| 4,102,712 | 7/1978 | Martin ................................. 362/71 |
| 4,195,327 | 3/1980 | Piquot . |
| 4,237,529 | 12/1980 | Mutschler et al. . |
| 4,471,413 | 9/1984 | Dick . |
| 4,482,939 | 11/1984 | Tishman . |
| 4,503,486 | 3/1985 | Makita . |
| 4,516,191 | 5/1985 | Moriyama et al. . |
| 4,584,634 | 4/1986 | Sigety . |

Primary Examiner—Larry Jones
Attorney, Agent, or Firm—Marshall, O'Toole, Gerstein, Murray & Bicknell

[57] ABSTRACT

This disclosure relates to a support and adjustment mechanism for a headlamp mounted in a carrier panel of the body of a vehicle, there also being a fixed pivot point support also connecting the headlamp with the panel. The mechanism comprises a support bracket adapted to be secured to the carrier panel, the bracket having an angle lever pivotably mounted on it. The lever has one end threadedly coupled to a generally vertical shaft, and its other end pivotably coupled to a generally horizontal shaft, the pivotable connection to the bracket being between the two ends of the lever. The vertical shaft is connected to the support bracket such that it may be rotated but is restrained against axial movement, whereby rotation of the vertical shaft results in pivotal movement of the lever and horizontal movement of the horizontal shaft. A guide is mounted on the bracket and resiliently engages the horizontal shaft for reducing vibrations. The connections of the vertical shaft to the bracket and to the lever enable the vertical shaft to pivot while rotating.

9 Claims, 3 Drawing Sheets

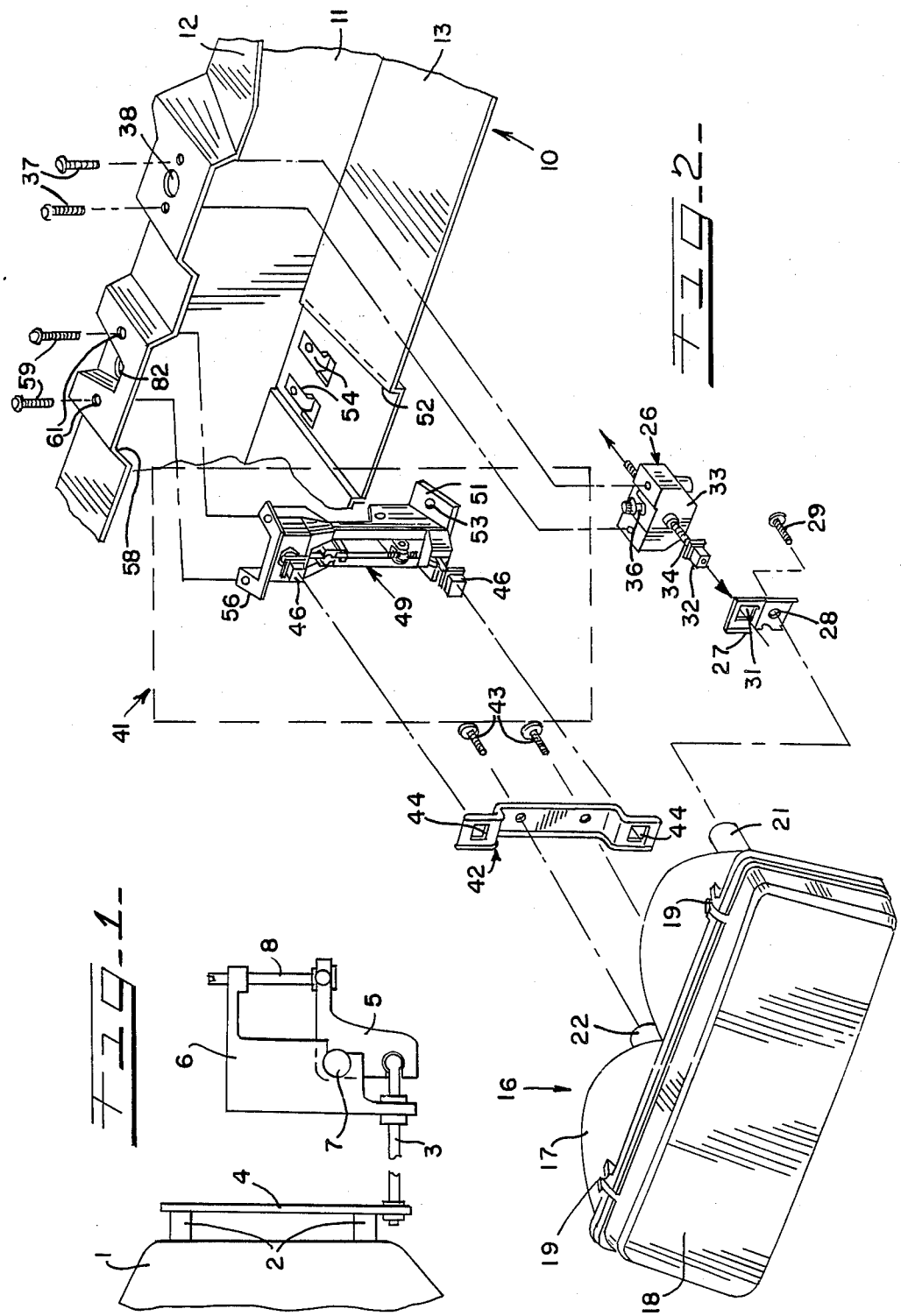

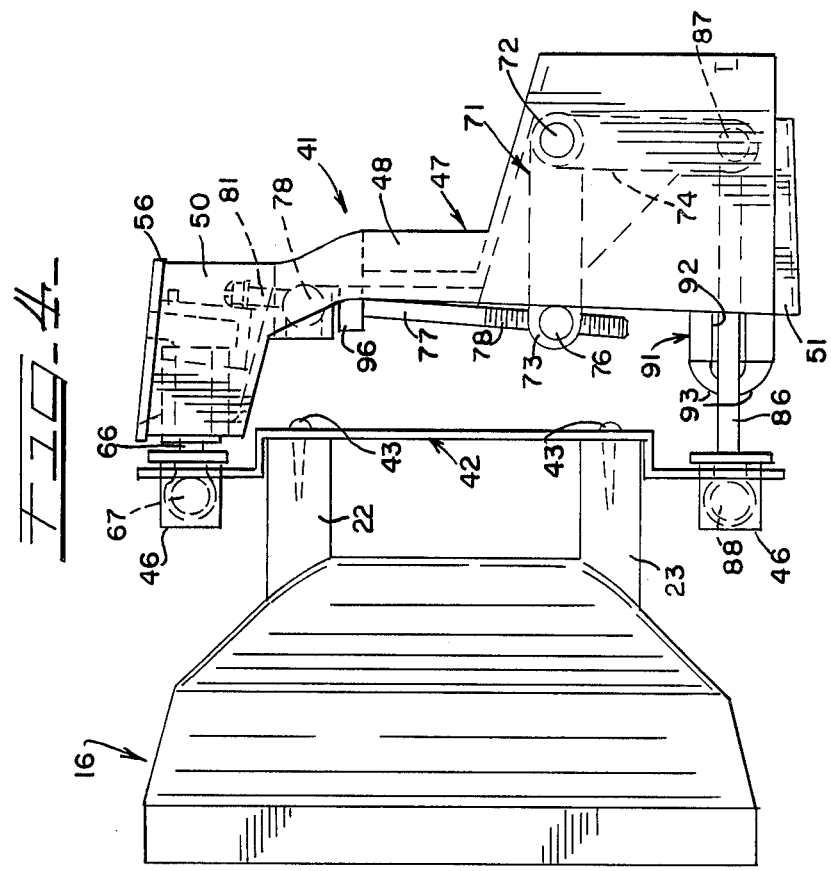
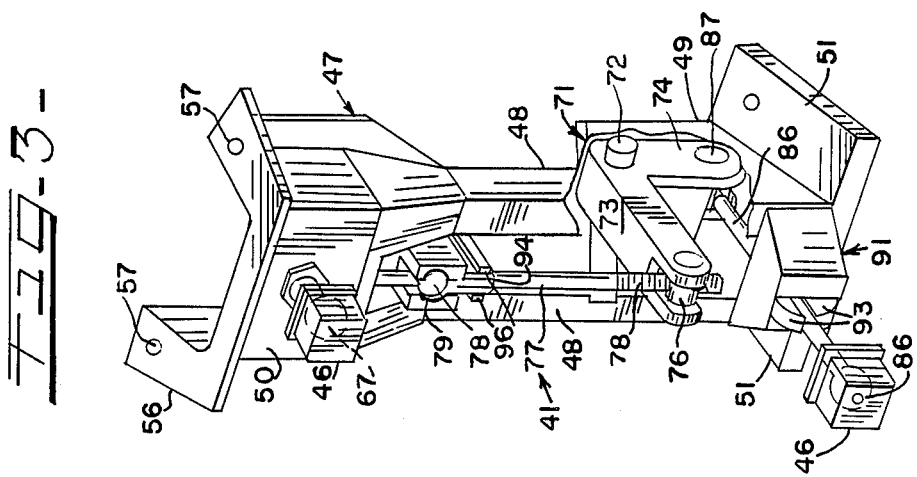

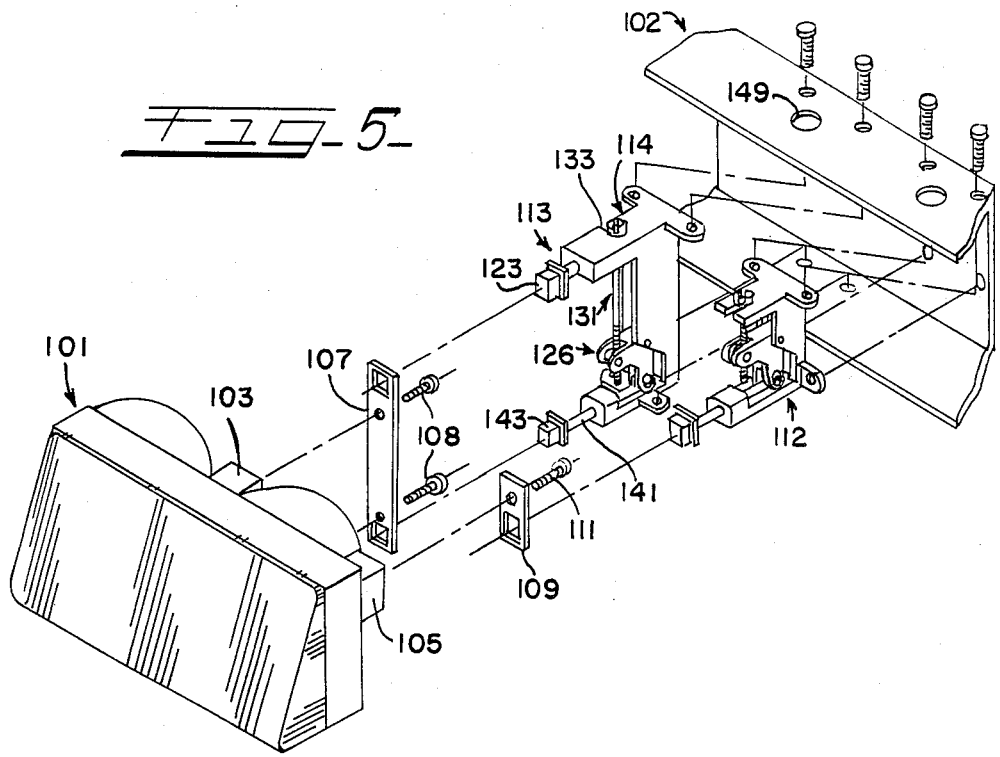
Fig-5-
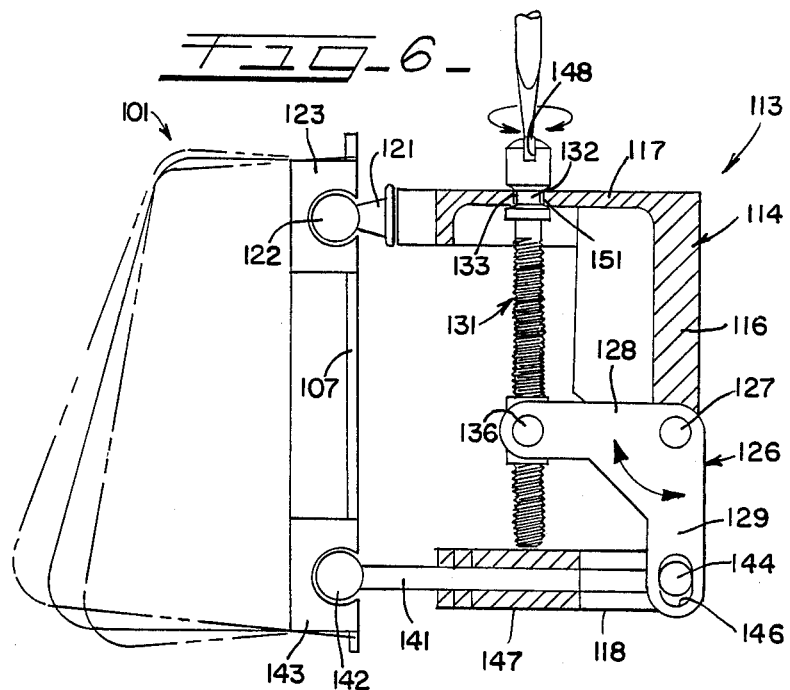
Fig-6-

SUPPORT AND ADJUSTMENT MECHANISM FOR VEHICLE HEADLAMP

FIELD AND BACKGROUND OF THE INVENTION

This invention relates to mechanisms for supporting and adjusting headlamps of vehicles such as automobiles.

The mounting supports for automotive headlamps normally include adjustments for pivoting the lamps. For each lamp there is an up-down adjustment for pivoting the lamp in a vertical plane, and a left-right adjustment for pivoting the lamp in a horizontal plane. In addition to being adjustable, the mounting support has to be sturdy and not allow the lamp to vibrate or shift during operation of the automobile.

Numerous headlamp supports and adjustment mechanisms have been provided in the prior art, such as those shown in the following U.S. patents:

| | | |
|---|---|---|
| 4,584,634 | 4,516,191 | 4,503,486 |
| 4,482,939 | 4,471,413 | 4,237,529 |
| 4,195,327 | Re. 32,088 | |

In addition to the mechanisms shown in the above patents, the prior art also includes a bevel gear design wherein a vertical shaft is coupled to a horizontal shaft by a bevel gear connection. The horizontal shaft is connected to the headlamp and the vertical shaft may be rotated by a tool such as a screwdriver in order to adjust the angle of the beam. Further, the vertical shaft is accessible by lifting the hood of the automobile, rather than from the front of the lamp as is the case with most lamps.

Still another prior art arrangement is shown in FIG. 1 of the drawings herein, wherein the numeral 1 indicates the back side of a headlamp having bosses 2 on it. A horizontal shaft 3 is attached to a plate 4 on the bosses and it is coupled to a lever 5. A mounting bracket 6 supports the lever 5 by a pivot pin 7, and a vertical shaft 8 is threadedly connected to the bracket 6 and pivotably connected to the lever 5. When the shaft 8 is screwed up or down in a threaded hole of the bracket, it causes the lever 5 to pivot and thereby move the shaft 3 and the lower part of the headlamp in the forwardrearward direction.

A headlamp design recently coming into use in place of the common sealed beam light includes a glass shell that encloses a bulb, and a lens that covers the front of the shall. It is preferable that such a lamp be enclosed by the vehicle body, and this style is also desirable for aesthetic reasons. However, this style requires that any adjustment of the lamp be made from under the hood.

The prior art described above does not adequately form a firm and adjustable support which is accessible from above (from under the hood). The design using gears is relatively complex and expensive. On the other hand, the design shown in FIG. 1 does not form a stable and firm support for the lamps. Since the ends of the lever 5 swing in arcs, the associated ends of the shafts 3 and 8 must also be able to swing. This movement is accommodated by making parts of the support bracket 6 flexible, but this flexibility also allows the lamp to vibrate excessively.

It is a general object of the present invention to provide a novel and improved mechanism which avoids the disadvantages of the prior art.

SUMMARY OF THE INVENTION

A support and adjustment mechanism in accordance with the invention is for use with a headlamp mounted in a carrier panel of the body of a vehicle, there also being a fixed pivot point support connecting the headlamp with the panel. The mechanism comprises a support bracket adapted to be secured to the carrier panel, the bracket having an angle lever pivotably mounted on it. The lever has one end threadedly coupled to a generally vertical shaft, and its other end pivotably coupled to a generally horizontal shaft, the pivotable connection to the bracket being between the two ends of the lever. The vertical shaft is connected to the support bracket such that it may be rotated but is restrained against axial movement, whereby rotation of the vertical shaft results in pivotal movement of the lever and horizontal movement of the horizontal shaft. A guide is mounted on the bracket and resiliently engages the horizontal shaft for reducing vibrations. The connections of the vertical shaft to the bracket and to the lever enable the vertical shaft to pivot while rotating.

BRIEF DESCRIPTION OF THE DRAWINGS

The invention will be better understood from the following detailed description taken in conjunction with the accompanying figures of the drawings, wherein:

FIG. 1 is a schematic illustration of a prior art construction

FIG. 2 is an exploded view of parts including a mechanism in accordance with the present invention;

FIG. 3 is an enlarged perspective view of the mechanism;

FIG. 4 is a side view of the mechanism;

FIG. 5 is a view similar to FIG. 2 but showing an alternative construction; and

FIG. 6 is a side view illustrating the mechanism shown in FIG. 5.

DETAILED DESCRIPTION OF THE DRAWINGS

While the following detailed description includes words indicating the locations of parts relative to other parts in figures of the drawings, such as above, below, upper, bottom, forward, etc., and similar references to directions of movement, it will be understood that such references are used only to assist in the description of the drawings and should not be considered as limiting the use of the structure to any particular orientation.

Further, in the specific example described herein, there are references to a headlamp for an automobile. However, it should be recognized that the structure may also be used in other vehicles wherein adjustable lamps are required.

Mechanisms in accordance with this invention are adapted for use in an automotive vehicle including a lamp carrier panel 10 which forms part of the body of the vehicle. The panel 10 is formed by a vertical backside 11 and top and bottom flanges 12 and 13 which are formed integrally. The panel 10 supports mechanisms which in turn support and permit adjustment of the position of a headlamp 16 (which is conventional and does not form part of this invention). In this example, the lamp 16 is formed by a glass shell 17, a front lens 18, and clips 19 which serve to fasten the lens 18 to the glass shell 17. The shell 17 in this example includes two parabolic parts, each of which encloses a bulb (not illustrated). Formed on the backside of the glass shell 17 are three bosses 21, 22 and 23 (see FIGS. 2 and 4). The boss 21 is formed at an upper corner of the shell 17, the boss 22 is formed at the upper center of the shell, and the boss 23 is formed at the lower center of the shell, the three bosses extending rearwardly from the backside of the shell 17. Screw holes (not shown) are formed in the three bosses.

A conventional mechanism 26 (FIG. 2) is provided for fastening the upper corner boss 21 to the carrier panel 10 in such a manner that the boss 21 may be moved in the forward-rearward direction relative to the panel. This is the construction referred to above as the bevel gear design. The mechanism 26 includes a bracket 27 having a mounting hole 28 formed in it. A screw 29 extends through the hole 28 in order to secure the bracket 27 to the backside of the boss 21. The bracket 27 also includes a square-shaped hole 31 which receives a square-shaped clip or insert 32. The insert 32 is pressed into the hole 31 and clipped thereto, thereby fastening the insert 32 to the boss 21.

The mechanism 26 further includes a casing 33 and a horizontal shaft 34, the forward end of the shaft 34 having a ball and socket connection with the interior of the insert 32, whereby the insert 32 may be pivoted on the forward end of the shaft 34. A vertical shaft 36 is also provided, and within the casing 26 are two bevel gears (not shown) and a threaded connection between the gears and the shaft 34. The connection is such that when the vertical shaft 36 is rotated, the horizontal shaft 34, as well as the boss 21, is moved in the forward-rearward direction.

The casing 26 is mounted on the top flange 12 of the panel 10 by two screws 37 which extend through holes formed in the top flange 12 and are threaded into the upper side of the casing 33. An access hole 38 is formed in the top flange 12 between the two screws 37 and above the upper end of the vertical shaft 36. The upper end of the shaft 36 is shaped for engagement by a tool, so that a serviceman may insert the tool through the access hole 38 and engage the upper end of the shaft 36 in order to rotate it. It will be obvious that rotation of the shaft 36 in one direction or the other will cause the boss 21 connected to the shaft 34 to move in the forward-rearward direction relative to the panel 10. This movement causes the lamp to pivot in a horizontal plane on a fixed pivot point that will be described hereinafter.

A mechanism 41 in accordance with this invention, enclosed in the dashed lines in FIG. 2 and illustrated in more detail in FIGS. 3 and 4, is also provided to connect the panel 10 with the two center bosses 22 and 23. A headlamp bracket 42 (FIGS. 2 and 4) extends vertically across the rearward sides of the two bosses 22 and 23 and is secured to the bosses by two screws 43. The bracket 42 extends upwardly and downwardly from the two bosses, and square holes 44 are formed in the upper and lower extensions. The two holes 44 receive square inserts 46 which are similar to the insert 32 previously described. The inserts 46 are pressed into the two holes 44 and thereby fastened to the bracket 42 by a snap fit.

The mechanism 41 comprises a support casing 47, best illustrated in FIGS. 3 and 4. The casing 47 includes two horizontally spaced, generally vertically extending columns 48 which have their upper and lower ends connected to an upper support 50 and a lower support 49, respectively. The lower support 49 includes two horizontal bottom flanges 51 which, in use, are positioned within a recess 52 (FIG. 2) formed in the bottom flange 13 of the carrier panel 10. The casing 47 is fastened to the bottom flange 13 by screws (not shown); two holes 53 are formed in the bottom flanges 51 of the lower support 49, and the screws are passed through the holes 53 and connected to clips 54 which, in turn, are fastened to the bottom flange 13 of the carrier panel 10. At the upper end of the casing, an upper flange 56 is formed on the upper support 50, and screw holes 57 are formed in the upper flange 56. The flange 56 is located within a recess 58 formed in the top flange 12 of the carrier panel, and screws 59 are passed through holes 61 formed in the top flange 12 and threaded into the holes 57. Thus, the upper and lower supports 50 and 49 of the casing 47 are secured firmly to the top and bottom flanges 12 and 13 of the carrier panel 10.

Extending forwardly from the upper support 50 is a pin 66 which has a ball 67 formed on its forward end. The ball 67 is shaped to snap into the interior enclosure of the insert 46, thereby pivotally connecting the upper end of the bracket 42 to the upper support 50 of the casing 47. The center of the ball 67 thereby forms a fixed pivot point at the backside of the headlamp 16.

The mechanism 41 further comprises a lever 71 which is pivotably mounted on the casing 47 by a pivot pin 72. The pin 72 has its ends supported by the casing 47 and the lever 72 is mounted on the center area of the pin and extends between the two columns 48. In the present example, the lever 71 has a right angle shape and includes an upper, generally horizontal arm 73 and a lower generally vertical arm 74, the pivot pin 72 being located at the intersection of the two arms 73 and 74.

The upper arm 73 extends generally forwardly from the pivot pin 72 and its forward end is bifurcated as shown in FIG. 3. A pivot pin 76 extends generally horizontally on the forward end of the arm 73, and a generally vertically extending internally threaded hole is formed through the pivot pin 76. A shaft 77 having an outer threaded portion 78 is threadedly connected with the hole in the pin 76, and the shaft 77 extends upwardly from the arm 73 to the upper support 50. A pivot ball 78 is secured to the shaft 77 adjacent its upper end, and the ball 78 is rotatably mounted in a socket 79 formed on the support 50 of the casing. Consequently, the ball 78 and the shaft 77 are able to pivot and to rotate relative to the socket 79 and the support 50, but the ball and socket arrangement prevents the shaft 77 from moving vertically in the direction of its axis relative to the casing 47. The upper end 81 (FIG. 4) of the shaft 77 is shaped to receive a screwdriver so that the shaft 77 may be rotated as will be described. With reference to FIG. 2, an access hole 82 is formed in the top flange 12 of the carrier panel 10, so that a person may insert a screwdriver or other similar tool through the hole 82 and engage the end 81 in order to rotate the shaft 77. As will be described hereinafter, the rotation of the shaft 77 results in generally vertical movement of the pivot pin 76 because the shaft 77 is prevented from moving along its axis.

The mechanism further includes a generally horizontal lower shaft 86 which extends forwardly from the lower end of the arm 74 of the lever to the insert 46 which is mounted on the lower end of the bracket 42. A pivot pin 87 is mounted on the lower end of the arm 74 similarly to the mounting of the pin 76, and the rearward end of the shaft 86 is secured to the pin 87. The forward end of the shaft 86 has a ball 88 fastened to it, which is rotatably mounted within the lower insert 46.

Mounted on the casing 47 between the arm 74 of the lever and the bracket 42 is a guide 91 which extends forwardly from the two columns 48. The guide 91 has a passage 92 formed through it which receives the shaft 86. At the forward end of the guide 91 are formed two pressure fingers or jaws 93 which tightly engage the upper and lower surfaces of the shaft 86. The pressure fingers 93 are located relatively close to the bracket 42 and restrain the forward end of the shaft 86 against excessive vibratory motion. The fingers 93, however, allow the shaft 86 to move along its axis.

The shank of the shaft 77 includes a portion 94 having flat sides, and may be, for example, a hexagon in cross section. Two fingers 96 are formed on the case 47 and engage the portion 94 on opposite sides, and the fingers 96 have an inherent spring force which presses them against the shaft 77, and as a consequence the fingers hold the shaft 77 in a selected position. In addition, when the shaft 77 is rotated, the fingers 97 strike the flat sides of the portion 94 and form a clicking noise. By counting the number of clicks, a service person rotating the shaft 77 is made aware of the extent of rotation of the shaft 77. The rotation may be correlated with the angular movement of the lever 71 and the amount of movement of the headlamp 16.

The structure shown in FIG. 2 is assembled by positioning the mechanism 26 underneath the access hole 38 and fastening it to the top flange 12 using the screws 37. The casing 47 of the mechanism 41 is positioned with the lower flanges 51 in the recess 52 and the upper flange 56 in the recess 58, and then secured to the top and bottom flanges of the panel 10 by the screws. In this position of the two mechanisms 26 and 41, the upper ends of the shafts 36 and 77 are accessible through the holes 38 and 82.

The bracket 42 is fastened to the bosses 22 and 23 at approximately the center of the headlamp using the screws 43, and the inserts 46 and 32 are fastened to the balls on the ends of the shafts 34, 66 and 86. The bracket 27 is also fastened to the upper corner boss 21 using the screw 29. The inserts 32 and 46 are then fastened to the brackets 27 and 42 by moving the headlamp, having the brackets 27 and 42 fastened to it, rearwardly and locating the inserts in the holes 31 and 44 and pressing the brackets over the inserts until they snap over the inserts.

To adjust the angle of a headlamp in the right-left direction, a tool is inserted through the access hole 38 and engaged with the shaft 36. By rotating the vertical shaft 36, the horizontal shaft 34 is moved in the forward or rearward direction. The headlamp then pivots in a horizontal plane on a generally vertical axis that extends through the center points of the balls 67 and 88 at the center of the headlamp.

To adjust the headlamp in the up-down direction (movement in a generally vertical plane), a tool is inserted in the access opening 82 and engaged with the upper end 81 of the vertical shaft 77. As the shaft 77 is rotated, the ball 78 rotates in the socket 79 and the fingers 96 engage the flats of the portion 94 and provide a small restraining force as well as a clicking noise. Since the shaft 77 is prevented from moving in the direction of its axis due to the interconnection between the ball 78 and the socket 79, rotation of the shaft 77 causes the pivot pin 76 and the arm 73 of the lever to move up or down, depending upon the direction of rotation of the shaft 77. The pivot pin 76 moves in an arc about the center of the pin 72 and, of course, the lower end of the shaft 77 follows this arcuate movement. The arcuate movement is, however, accommodated by the pivotal connection at the ball 78-socket 79 coupling.

As the arm 73 of the lever 71 pivots, the other pivot pin 87 and the lower end of the arm 74 also swing in an arc and move the horizontal shaft 86 either in or out, depending upon the direction of rotation of the shaft 77. The pin 87 also swings in a slight arc which is accommodated by the ball and socket connection with the lower end of the bracket 42 and by the pivotable connection between the rearward end of the shaft 86 and the lower end of the arm 74. The fingers 93 of the guide 91 tightly engage the sides of the shaft 86 but at the same time allow the shaft 86 to move in the forward-rearward direction and to be angularly displaced.

As a consequence, as the shaft 77 is rotated, the lower end of the headlamp is moved either in or out due to the movement of the lower shaft 86, and the headlamp pivots on an axis that extends through the centers of the upper ball 67 and the ball at the forward end of the shaft 34. Since both axes of pivotal movement extend through the center of the upper ball 67, the center of this ball may be considered a fixed pivot point since it remains stationary during both the up-down direction of adjustment and the right-left direction of adjustment.

Instead of using the prior art mechanism 26 for the right-left direction of adjustment, a mechanism similar to the mechanism 41 could be used instead. FIGS. 5 and 6 illustrate such an arrangement and also show an alternative embodiment of the invention for adjusting the direction of a headlamp 101 which may have generally the same construction as the headlamp 16. The headlamp 101 is adjustably mounted on a lamp carrier panel 102 which is similar to the panel 10. Bosses 103 and 104 are formed at approximately the center of the headlamp 101 and an upper corner boss 105 is also provided. A center mounting bracket 107 is fastened to the two center bosses 103 and 104 by screws 108, and a corner bracket 109 is fastened to the boss 105 by a screw 111.

Apparatus in accordance with the invention includes a right-left adjustment 112 and an up-down adjustment 113. Both have generally the same construction, and the up-down adjustment 113 is shown in greater detail in FIG. 6. It includes a generally C-shaped casing 114 having a center part 116 and upper and lower arms 117 and 118. At the forward end of the upper arm 117 is mounted a pin 121 having a ball 122 formed on it, which is mounted in an insert 123. The insert 123, of course, is connected to the upper end of the center bracket 107, as described in connection with the embodiment shown in FIGS. 1-4.

The mechanism 113 further includes a right-angled lever 126 which is pivotally connected to the center part 116 of the casing by a pivot pin 127. The lever 126 includes a generally horizontal arm 128 that extends forwardly from the pin 127, and a generally vertical arm 129 that extends generally downwardly from the pin 127.

A generally vertical threaded shaft 131 is rotatably connected to the upper arm 117 of the casing 114. In the present illustration, a reduced diameter portion 132 is formed adjacent the upper end of the shaft 131 and it is received within a slot or opening 133 formed in the upper arm 117. Thus, the shaft 131 can rotate on the upper arm 113 but the relatively snug fit of the slot 133 around the recessed portion 132 prevents the shaft 131 from moving along its axis. The recessed portion 132 has beveled sides 151 so that the axis of the shaft 131 can pivot relative to the arm 117. The threaded shank of the shaft 131 is threadedly coupled to a pivot pin 136 which is pivotably connected to the forward end of the horizontal arm 128. The pin 136, of course, can pivot on the arm 128.

The mechanism further comprises a generally horizontal shaft 141 which has a ball 142 formed on its forward end. The ball 142 is fastened in an insert 143 which is connected to the lower end of the bracket 107, as previously described. The rearward end of the shaft 141 is connected to a pivot pin 144 which is also movably connected to the lower end of the arm 129 of the lever 126. As best shown in FIG. 6, the pin 144 extends into a vertically elongated slot 146 formed in the lower end of the lever 126, whereby the rearward end of the shaft 141 and the pin 144 are able to shift relative to the arm 129. The shank of the shaft 141 extends through a hole in a guide 147 formed by the lower arm of the casing 114. The hole snugly receives the shaft 141 although it permits forward-rearward movement of the shaft 141. Thus, the guide 147 restrains the forward end of the shaft 141 against vibratory movement.

The upper end of the vertical shaft 131 has a screwdriver slot 148 formed in it, which is accessible through a hole 149 formed in the top flange of the carrier panel 102. When the shaft 131 is rotated by a service person, the pin 136 and the forward end of the arm 128 are moved either up or down depending upon the direction of rotation of the shaft 131. The pin 136 pivots on the forward end of the arm 128 since the pin 136 moves in an arc as the shaft 131 is turned. The shaft 131 will also have a small change in its angle relative to the upper arm 117 due to the arcuate movement of the forward end of the arm 128, and the connection between the shaft 131 and the arm 117 permits this angular shift.

As the lever 126 is pivoted on the pin 127 due to the rotation of the shaft 131, the other shaft 141 is moved in the forward or rearward direction. Since the lower end of the arm 129 also has an arcuate movement, whereas the movement of the shaft 141 is substantially along its axis due to the guide 147, the pin 144 shifts slightly in the slot 146 of the arm 129.

The other mechanism 112 has essentially the same construction as the mechanism 113. The mechanism 113 has a vertically shorter casing than that of the mechanism 113, and the mechanism 112 does not support an upper ball corresponding to the ball 122.

It will therefore be apparent that the mechanism 112 may be adjusted to change the angle of the headlamp 101 in the right-left direction, whereas the mechanism 113 may be adjusted to change the angle of the headlamp 101 in the up-down direction. Again, the center point of the upper center ball 122 forms a fixed pivot point.

In the embodiments of the invention described herein, each mechanism includes a casing for supporting the remaining parts in an assembly which may be installed as a unit on the body of a vehicle. Instead of such a casing, a support for at least some of the parts could be formed as part of the body, in which case some or all of the moving parts would be mounted directly on the body.

It will be apparent from the foregoing that a novel and useful mechanism has been provided. The mechanism provides firm support for a headlamp while at the same time enabling an adjustment of the angle of the lamp. In both embodiments of the invention, the lower shafts which are adjustable in the forward-rearward directiion are restrained against vibratory movement by a guide which nevertheless permits the shaft to pivot slightly as the lever is rotated. The other generally vertical shaft has pivotable connections with the casing and with the lever. The mechanism may further have a fixed pivot point firmly fixed on it for supporting the upper part of the lamp against movement. The mechanism is, further, sturdily but inexpensively constructed.

What is claimed is:

1. A mechanism for adjusting the position of a headlamp on the body of a vehicle, comprising:
   1. a casing adapted to be fastened to the body;
   2. a lever having an angular configuration and having first and second pivots and pivot means, said pivot means forming a pivot point between said lever and said casing whereby said lever may be pivoted directly on said casing;
   3. a first shaft and a second shaft;
   4. first means threadedly connecting said first shaft to said first pivot and connecting said first shaft to said casing for rotary and pivotal movement of said first shaft but restraining axial movement of said first shaft relative to said casing; and
   5. second means pivotably connecting said second shaft to said second pivot means and adapted to connect said second shaft to the headlamp;
   6. whereby rotation of said first shaft causes the lever to pivot on said casing and said second shaft to move, such movement of said second shaft resulting in movement of the headlamp.

2. A mechanism as in claim 1, and further including guide means fastened to said casing and engaging said second shaft for holding said second shaft against vibratory movement.

3. A mechanism as in claim 1, wherein said lever has a generally right angle shape, said first and second pivots being adjacent the ends of said lever and said pivot means being between said first and second pivots.

4. A mechanism as in claim 1, and further including a fixed pivot point comprising a member attached to said casing and adapted to be pivotably connected to the headlamp, said member and its connection to the headlamp being spaced from said second shaft and its connection to the headlamp.

5. A mechanism as in claim 1, and further including restraining means mounted on said casing and connected to said first shaft for retarding rotational movement of said first shaft, said restraining means further making a noise as said first shaft is rotated.

6. A mechanism as in claim 1, wherein said second pivot and said second means comprise a pivot pin attached to said second shaft, and an enlarged opening in said lever, said pivot pin being located in said enlarged opening and being movable therein.

7. A mechanism as in claim 1, wherein said first and second pivots and said pivot means are located at the apexes of a triangle.

8. A mechanism for adjusting the position of a headlamp on the body of a vehicle, the body including a support, comprising:
   1. a lever having an angular configuration and having first and second pivots and pivot means, said pivot means forming a pivot point between said lever and said support whereby said lever may be pivoted directly on said support;

2. a first shaft and a second shaft;
3. first means threadedly connecting said first shaft to said first pivot and adapted to connect said first shaft to said support for rotary and pivotal movement of said first shaft but restraining axial movement of said first shaft relative to said support; and
4. second means pivotably connecting said second shaft to said second pivot and adapted to connect said second shaft to the headlamp;
5. whereby rotation of said first shaft causes the lever to pivot on said support and said second shaft to move, such movement of said second shaft resulting in movement of the headlamp.

9. A mechanism for supporting and adjusting the position of a headlamp in a carrier panel of a vehicle, there being a fixed pivot point connecting the lamp with the panel, said mechanism comprising:
   (a) a support bracket adapted to be secured to the carrier panel;
   (b) a lever having first and second ends and a pivot axis, said pivot axis being between said ends;
   (c) pivot means connecting said lever to said bracket for pivotal movement of said lever on said axis;
   (d) a first shaft;
   (e) first means connecting said first shaft to said bracket and permitting rotative movement but preventing axial movement of said first shaft on said bracket;
   (f) second means connecting said first shaft with said first end of said lever and permitting rotative and pivotal movement therebetween, said second means further forming a threaded connection, whereby rotation of said first shaft results in pivotal movement of said first end relative to said pivot axis;
   (g) a second shaft; and
   (h) third means pivotably connecting said second shaft to said second end of said lever, said second shaft further including fourth means adapted to pivotably connect said second shaft to said headlamp at a point which is displaced from said fixed pivot point.

* * * * *